(12) United States Patent
Lowe et al.

(10) Patent No.: US 6,189,067 B1
(45) Date of Patent: *Feb. 13, 2001

(54) SYSTEM AND METHOD FOR DYNAMICALLY SELECTING INTERRUPT QUANTITY THRESHOLD PARAMETERS

(75) Inventors: Glen H. Lowe, Union City; Edmund Chen, Sunnyvale, both of CA (US)

(73) Assignee: 3COM Corporation, Santa Clara, CA (US)

( * ) Notice: Under 35 U.S.C. 154(b), the term of this patent shall be extended for 0 days.

This patent is subject to a terminal disclaimer.

(21) Appl. No.: 09/258,514

(22) Filed: Feb. 26, 1999

Related U.S. Application Data

(63) Continuation-in-part of application No. 09/237,995, filed on Jan. 26, 1999.

(51) Int. Cl.$^7$ .................................................. G06F 13/24
(52) U.S. Cl. .............................................................. 710/260
(58) Field of Search ...................... 710/260–269

(56) References Cited

U.S. PATENT DOCUMENTS

| | | | | |
|---|---|---|---|---|
| 5,319,752 | * | 6/1994 | Petersen et al. | 709/234 |
| 5,412,782 | * | 5/1995 | Hausman et al. | 709/250 |
| 5,440,690 | * | 8/1995 | Rege et al. | 709/250 |
| 5,530,874 | * | 6/1996 | Emery et al. | 710/262 |
| 5,613,129 | * | 3/1997 | Walsh | 710/267 |
| 5,659,758 | * | 8/1997 | Gentry et al. | 710/260 |
| 5,708,814 | * | 1/1998 | Short et al. | 710/260 |
| 5,717,870 | * | 2/1998 | Dobson | 709/250 |
| 5,761,427 | * | 6/1998 | Shah et al. | 709/223 |
| 5,875,343 | * | 2/1999 | Binford et al. | 710/263 |
| 5,881,296 | * | 3/1999 | Williams et al. | 710/263 |
| 5,905,913 | * | 5/1999 | Garrett et al. | 710/49 |
| 5,943,479 | * | 8/1999 | Klein et al. | 709/212 |
| 5,966,546 | * | 10/1999 | Thomas et al. | 395/868 |
| 5,968,158 | * | 10/1999 | Andrews et al. | 710/260 |
| 5,983,275 | * | 11/1999 | Ecclesine | 709/231 |
| 6,085,277 | * | 7/2000 | Nordstrom et al. | 710/263 |

\* cited by examiner

*Primary Examiner*—Sumato Lefkowitz
(74) *Attorney, Agent, or Firm*—Wagner Murabito & Hao LLP

(57) ABSTRACT

A system and method for dynamically calculating the quantity of peripheral component events to coalesce. In one embodiment, a host computer is adapted to have a peripheral component removably coupled thereto. The host computer is further adapted to operate a peripheral component driver. The peripheral component driver of the present embodiment is adapted to dynamically determine the quantity of peripheral component events to coalesce. The peripheral component is adapted to coalesce the determined quantity of the peripheral component events. Furthermore, the peripheral component is adapted to cause the generation of an interrupt upon the occurrence of the determined quantity of the peripheral component events. Also, the present embodiment periodically re-determines the quantity of the peripheral components which should be coalesced. As a result, the present invention dynamically optimizes the frequency with which interrupts are generated, thereby minimizing the CPU overhead associated with the servicing of interrupts.

8 Claims, 9 Drawing Sheets

SYSTEM AND METHOD FOR DYNAMICALLY SELECTING INTERRUPT QUANTITY THRESHOLD PARAMETERS

This Patent Application is a Continuation-in-Part of a commonly-owned, United States Patent Application entitled "Interrupt Optimization Using Varying Quantity Threshold", filed Jan. 26, 1999, having U.S. Ser. No. 09/237,995.

TECHNICAL FIELD

The present invention generally pertains to the field of computer networking. More particularly, the present invention is related to interrupt generation by a peripheral component.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

The NIC, like other hardware devices, requires a device driver which controls the physical functions of the NIC and coordinates data transfers between the NIC and the host operating system. An industry standard for interfacing between the device driver and the host operating system is known as the Network Device Interface Specification, or NDIS, which is developed by Microsoft Corporation of Redmond, Wash. The operating system layer implementing the NDIS interface is generally known as an NDIS wrapper. Functionally, the NDIS wrapper arbitrates the control of the device driver between various application programs and provides temporary storage for the data packets.

In one type of prior art system, in order for a NIC to communicate with or access the CPU, an interrupt must be generated. In such a prior art approach, hardware on the NIC generates an interrupt when the NIC has an event to be serviced. Each these aforementioned interrupts has substantial CPU overhead associated therewith. That is, every time an interrupt is generated, the CPU must: cease performing its current selected task; store relevant data, pointers, and the like; service the event(s) which triggered the interrupt; and return to the selected task. With the advent of high speed applications and environments such as, for example, Gigabit Ethernet or asynchronous transfer mode (ATM), data is being transferred from and arriving at the NIC at much higher rate. As a result, of the higher data transfer speeds, the generation of interrupts by the NIC becomes increasingly frequent. In fact, conventional hardware based interrupt generation schemes could result in the NIC almost continuously asserting interrupts to the CPU of the host computer. Under such circumstances, the overhead associated with servicing each interrupt triggering event becomes prohibitively excessive. That is, prior art interrupt generation approaches do not optimally minimize CPU utilization and overhead.

In an attempt to alleviate the problem of excessive CPU utilization and overhead due to frequent interrupt generation, one prior art approach employs interrupt coalescing. In such an approach, groups of events (e.g. transmit complete events, receive complete events, and the like) are stored or "coalesced", and a single interrupt is generated once a selected number of the events are obtained. That is, instead of generating an interrupt each time a transmit complete event occurs, an interrupt coalesced approach only generates an interrupt when, for example, five transmit complete events have been coalesced. In such an approach, CPU overhead associated with servicing transmit complete events is reduced. As an example, in order to service five transmit complete events in a non-coalesced approach, the CPU must cease performing its current selected task; store relevant data, pointers, and the like; service only a single transmit complete event; and return to the selected task on five separate occasions. However, to service five coalesced transmit complete events, the CPU will cease performing its current selected task; store relevant data, pointers, and the like; service all five coalesced transmit complete events; and return to the selected task on only one occasion. Although interrupt coalescing can reduce CPU utilization and overhead, interrupt coalescing alone is not sufficient to meet the needs of current peripheral components such as NICs. That is, even with interrupt coalescing, excessive CPU utilization and overhead problems still exist.

Thus, a need exists for a peripheral component interrupt generation system which reduces the frequency with which interrupts are generated. A need also exists for a peripheral component interrupt generation system which minimizes the CPU overhead associated with the servicing of interrupts. Still another need exists for a peripheral component interrupt generation system which meets the above-listed needs and which operates effectively in a coalesced interrupt environment.

DISCLOSURE OF THE INVENTION

The present invention provides a peripheral component interrupt generation system which reduces the frequency with which interrupts are generated. The present invention also provides a peripheral component interrupt generation system which minimizes the CPU overhead associated with the servicing of interrupts. The present invention further provides a peripheral component interrupt generation system which meets the above-listed needs and which operates effectively in a coalesced interrupt environment. The above accomplishments are achieved with a peripheral component interrupt generation system which chains coalesced interrupts.

Specifically, in one embodiment, a host computer is adapted to have a peripheral component removably coupled thereto. The host computer is further adapted to operate a peripheral component driver. The peripheral component driver of the present embodiment is adapted to dynamically determine the quantity of peripheral component events to coalesce. The peripheral component is adapted to coalesce the determined quantity of the peripheral component events. Furthermore, the peripheral component is adapted to cause the generation of an interrupt upon the occurrence of the determined quantity of the peripheral component events. Also, the present embodiment periodically re-determines the quantity of the peripheral components which should be coalesced. As a result, the present invention dynamically optimizes the frequency with which interrupts are generated, thereby minimizing the CPU overhead associated with the servicing of interrupts.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
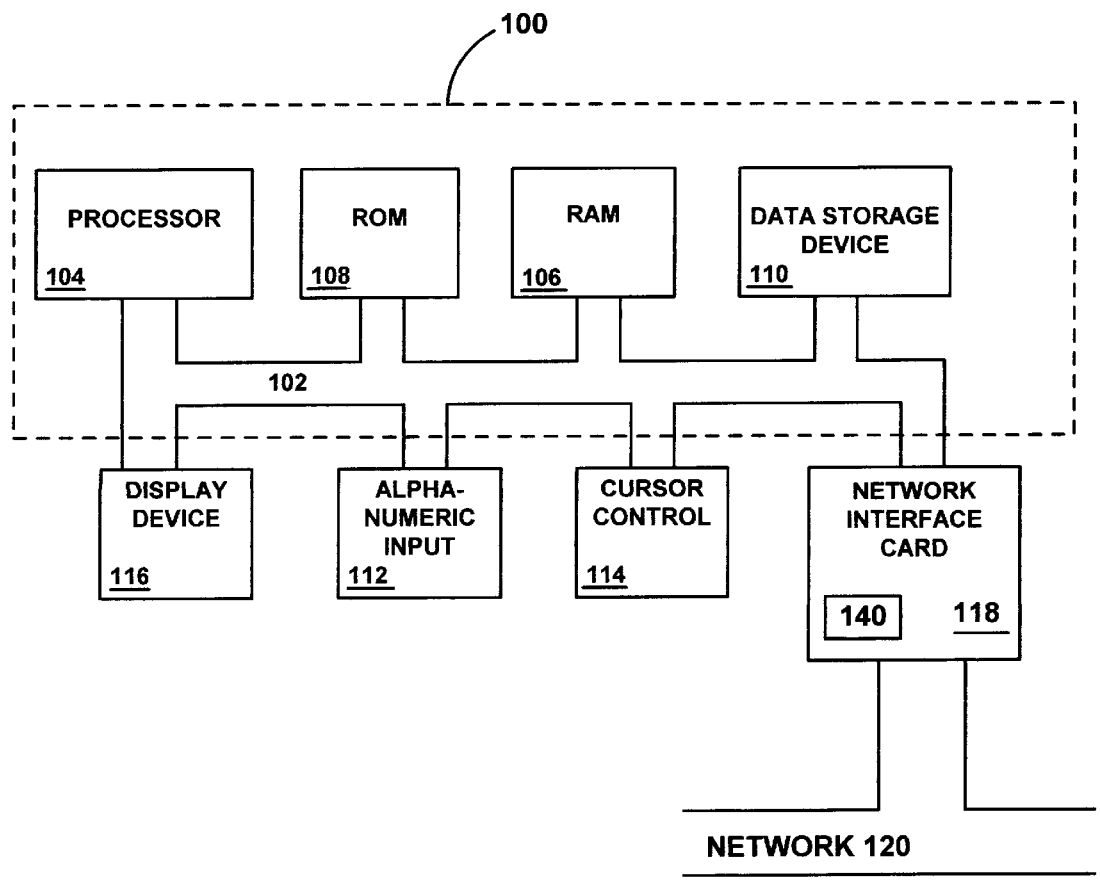
FIG. 1 is a schematic diagram of an exemplary computer system used to perform steps of the present interrupt events chaining method in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "measuring", "calculating", "receiving", "computing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INTERRUPT EVENTS CHAINING INVENTION

With reference now to FIG. 1, portions of the present interrupt events chaining method and system are comprised of computer-readable and computer-executable instructions which reside, for example, in computer-usable media of a computer system. FIG. 1 illustrates an exemplary computer system 100 used to perform the interrupt events chaining method in accordance with one embodiment of the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted having computer readable media such as, for example, a floppy disk, a compact disc, and the like coupled thereto.

Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the interrupt events chaining method and system embodiments of the present invention are found below.

With reference still to FIG. 1, significantly, a network interface card (NIC) 118 coupled to bus 102 is connected to a network 120 and controls the flow of information over network 120. Data packets, such as Ethernet packets, that are incoming arrive at NIC 118 via network 120 and are stored in FIFO memory 140 of NIC 118 before being transferred to other hardware and software of computer system 100. A more detailed discussion of NIC 118 in furtherance of the present invention is found below.

Figure 2:
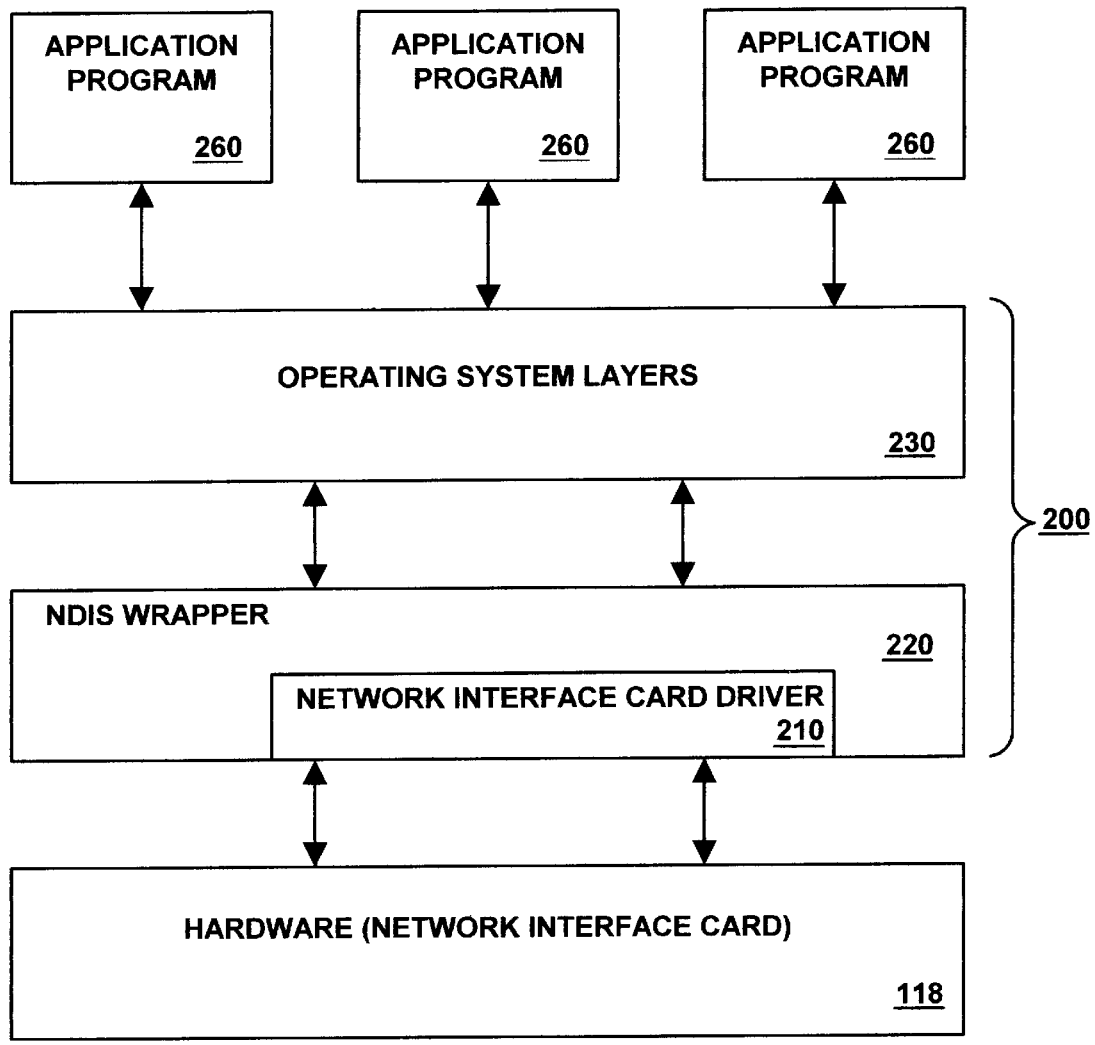
FIG. 2 is a schematic diagram of different operating layers associated with the computer system as illustrated in FIG. 1 in furtherance of one embodiment of the present invention.

Referring next to FIG. 2, a block diagram that represents the different layers of a host operating system 200 operable on computer system 100 of FIG. 1 is shown. Host operating system 200 includes a network interface card driver 210 that operates NIC 118 and moves data packets between NIC 118 and other hardware and software of computer system 100. Implemented directly above network interface card driver 210 is a network device interface specification (NDIS) wrapper 220. FIG. 2 further includes a schematic representation of operating system layers 230. NDIS wrapper 220 primarily arbitrates the control of network interface card driver 210 between various application programs, typically shown as 260.

Figure 3:
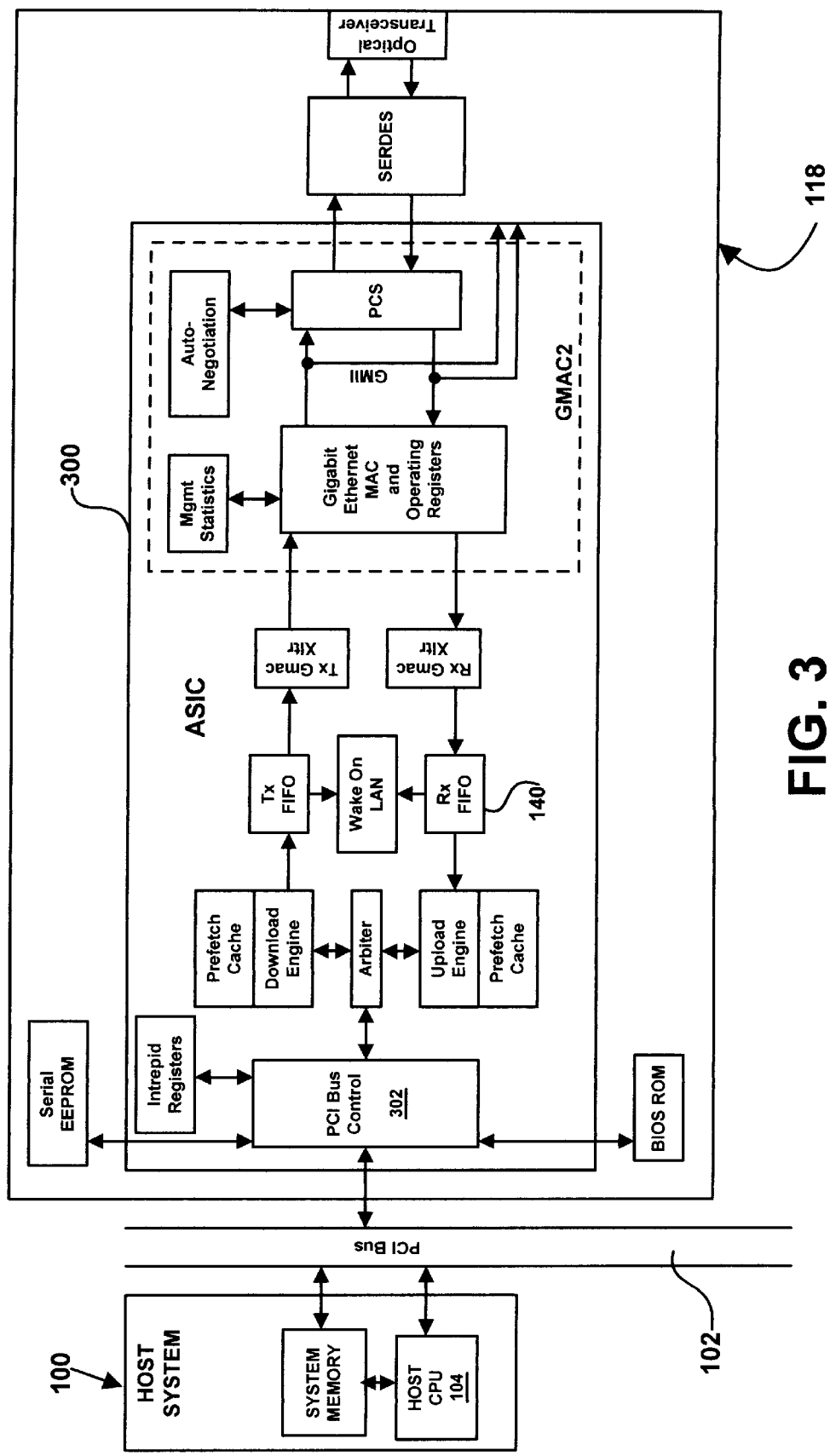
FIG. 3 is a schematic diagram of a host computer system having a network interface card coupled thereto in accordance with one embodiment of the present claimed invention.

Referring now to FIG. 3, a schematic diagram of a host computer system 100 having a network interface card 118 coupled thereto is shown. In the embodiment of FIG. 3, network interface card 118 includes a network interface card ASIC (application specific integrated circuit) 400, which contains various components and features. Although such a specific implementation is shown in the embodiment of FIG. 3, the present invention is also well suited to an embodiment having various other components and features.

GENERAL DESCRIPTION OF THE PRESENT INTERRUPT EVENTS CHAINING INVENTION

Figure 4:
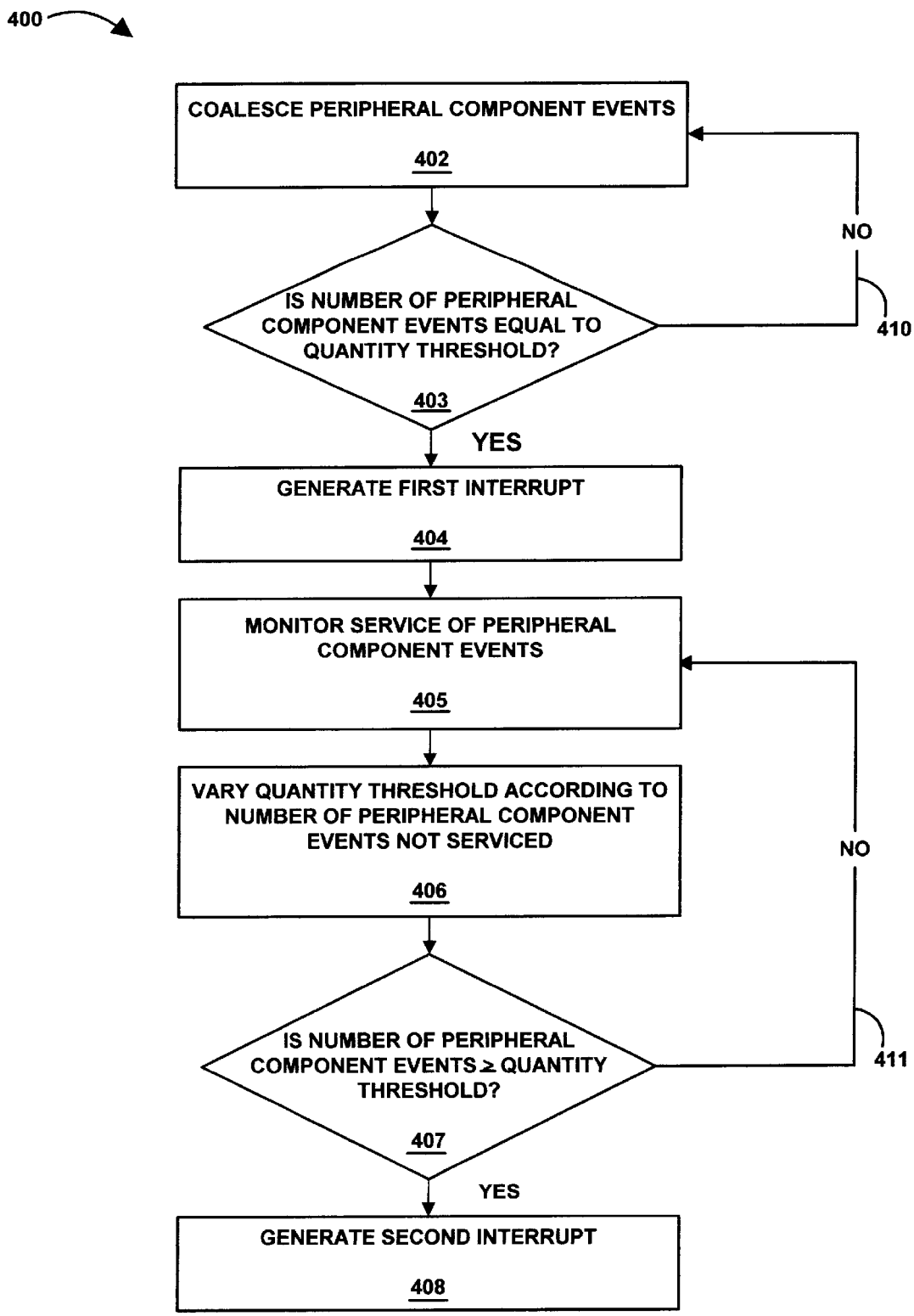
FIG. 4 is a flow chart of steps performed in one implementation of an interrupt optimization method in accordance with one embodiment of the present claimed invention.

With reference next to FIG. 4, an flow chart 400 of exemplary steps used by the present invention is shown. Flow chart 400 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control or operate in conjunction with, for example, central processing unit 104 of FIGS. 1 and 3, host operating system 200, and network device driver 210 both of FIG. 2. Although specific steps are disclosed in flow chart 400 of FIG. 4, such steps are exemplary. That is, the present invention is well suited to performing various other steps or variations of the steps recited in FIG. 4.

In step 402 of FIG. 4, in one embodiment of the present invention, network interface card driver 218 of FIG. 2 first determines whether an interrupt has been generated by the network interface card (NIC) 118 of FIGS. 1–3. In the following description of embodiments of the present invention, the peripheral component driver is a network interface card driver. Additionally, in the following description of embodiments of the present invention, the peripheral component is a network interface card. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver.. Additionally, the present invention is well suited to use in an embodiment in which the peripheral component is, for example, a rate controller, a small computer system interface (SCSI) controller, a graphics card, and the like.

Referring still to step 402 of FIG. 4, in the present embodiment, NIC 118 of FIGS. 1–3, generates an initial or first interrupt signal upon the occurrence of peripheral component event. For example, once NIC 118 has an event such as a completed transmission of data (i.e. a transmit complete event), NIC 118 will generate an interrupt. Although a single event (a transmit complete event) triggers the generation of the first interrupt in this embodiment, the present invention is also well suited to an embodiment in which a coalesced group of events triggers the generation of a first interrupt. In such an embodiment, events such as, for example, transmit complete events, are stored or "coalesced", and a single interrupt is generated once a selected number or quantity of the transmit complete events are obtained. Sometimes the selected number or quantity of events required to trigger the generation of an interrupt is referred to as a "watermark". Thus, instead of generating the first or initial interrupt each time a single transmit complete event occurs, in one embodiment of the present invention, the initial interrupt will only be generated when, for example, five transmit complete events have been coalesced. Hence, the present invention is well suited to an embodiment in which the initial interrupt is generated upon the occurrence of a single peripheral component event or upon reaching a watermark of coalesced peripheral component events.

With reference next to FIGS. 4–9, flow charts 400, 500, 600, 700, 800, and 900 of exemplary steps used by the present invention are shown. Flow charts 400, 500, 600, 700, 800, and 900 include processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control or operate in conjunction with, for example, central processing unit 104 of FIGS. 1 and 3, host operating system 200, and network device driver 210 both of FIG. 2. Although specific steps are disclosed in flow charts 400, 500, 600, 700, 800, and 900 such steps are exemplary. That is, the present invention is well suited to performing various other steps or variations of the steps recited in FIGS. 4–9.

In the following description of embodiments of the present invention, the peripheral component driver is a network interface card driver. Additionally, in the following description of embodiments of the present invention, the peripheral component is a network interface card. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver. Additionally, the present invention is well suited to use in an embodiment in which the peripheral component is, for example, a rate controller, a small computer system interface (SCSI) controller, a graphics card, and the like.

In step 402 of FIG. 4, in one embodiment of the present invention, peripheral component events are coalesced. In the embodiment shown in FIGS. 2–3, peripheral component events received by NIC 118 are coalesced by storing incoming peripheral component events in memory storage registers of ASIC 300. However, alternatively, memory storage devices such as, for example, Random Access Memory Devices, Flash memory devices, etc. could also be used.

Referring to steps 403 of FIG. 4, in the present embodiment, the number of peripheral component events that are coalesced is compared to a selected quantity of peripheral component events (the "quantity threshold"). More particularly, in the embodiment shown in FIGS. 2–3, peripheral component events are received and are stored by NIC 118 until the number of peripheral component events reaches the quantity threshold. Thus, the quantity threshold acts as a "watermark," regulating the number of component events that are coalesced.

Referring still to FIG. 4, if the number of coalesced peripheral component events has not reached the quantity threshold, as shown by line 410, the present embodiment returns to step 402 and continues coalescing peripheral component events (step 402) and determining whether the number of coalesced peripheral component events has reached the quantity threshold (step 403). If, on the other hand, the number of coalesced peripheral component events has reached the quantity threshold, the present embodiment proceeds to step 404. The following exemplary list recites several examples of peripheral component events and interrupts that may be generated by NIC 118 and subsequently coalesced in step 402 of the present embodiment:

| | | |
|---|---|---|
| IntLatch | [31]: | This bit is represents the bitwise OR of all the interrupt bits after the IntEnable<31> filter has been applied. This bit represents the equivalent of the inverse of the PCI INT#line. |
| StatusOverflow | [29]: | This bit indicates that one or more of the statistics counter is nearing an overflow condition. Reading all of the statistic registers will acknowledge this bit. |
| rxOverRun | [28]: | When set indicates that the internal Receive FIFO has overflowed and packet(s) have been discarded. |
| txIndication | [26]: | When set, indicates that a Transmit Status Descriptor (TSD) has been posted to the Transmit Status Queue (txSQ) in system memory txSQ. |
| rxIndication | [25]: | When set, indicates that a Receive Status Descriptor (RSD) has been posted to the Receive Status Queue (rxSQ). |
| txSQentry | [24]: | This bit is used to indicate that there are Transmit Status Descriptor (TSD) entries in the Transmit Status Queue (txSQ). This bit will only be set if the txIndication bit is also set. The driver can use this bit to prevent redundant interrupts when all TSD entries have already been processed. |
| rxSQentry | [23]: | This bit is used to indicate that there are Receive Status Descriptor (RSD) entries in the Receive Status Queue (rxSQ). This bit will only be set if the rxIndication bit is also set. The driver can use this bit to prevent redundant interrupts when all RSD entries have already been processed. |
| GmacInt | [11]: | When set, indicates that the GMAC2 core is generating an interrupt. |
| pmeEvent | [10]: | When this bit is set, the PowerMgmtEvent<15:0> register should be examined for further detail. |
| LostLink | [9]: | When set, indicates that receive synchronization has been lost. |
| LinkStatusChange | [8]: | When set, indicates that a change in the link status has occurred. |
| CountdownExpire | [7]: | When set, indicates that the programmed value in the Countdown<15:0> register has expired. |
| hwError | [5]: | This bit is set when the hardware detects an error. The specific error detected is reported in the hwErrStatus<31:0> register. |
| hostError | [4]: | This bit is set when a catastrophic error related to the bus interface occurs. The errors which set hostError are PCI target abort and PCI master abort. hostError is cleared by issuing a soft reset. |
| txXon | [3]: | This bit is set when the NIC has transmitted a XON PAUSE packet. |

| | | |
|---|---|---|
| txXoff | [2]: | This bit is set when the NIC has transmitted a XOFF PAUSE packet. |
| rxPaused | [1]: | This bit is set when the Transmit Path has been paused due to a reception of a XOFF PAUSE frame. When the pause time has expired or a XON PAUSE frame is received, then this bit is cleared. |
| txPause | [0]: | This bit is set when the NIC transmits a XOFF PAUSE frame due to congestion in the receive first-in first-out buffer (Rx FIFO). This bit is cleared upon read or a subsequent transmit of a XON PAUSE frame. |

Although such specific interrupts are recited above, the present embodiment is well suited to recognizing various other interrupts which may be generated by NIC 118.

With reference to step 404 of FIG. 4, in the present embodiment, a first interrupt is generated. In one embodiment, the triggering of an interrupt operates to transmit all coalesced events. That is, the present invention services the event that triggered the initial interrupt and then also services any coalesced events that are present. In the embodiment shown in FIGS. 1–3, the interrupt is generated by NIC 118. For example, once NIC 118 has coalesced a number of events such as, for example, transmit complete events equal to the quantity threshold of peripheral component events, NIC 118 generates an interrupt via PCI (peripheral component interconnect) bus control logic 302. It will be understood that in the embodiment of FIG. 4, PCI bus control logic 302 of FIG. 3 is employed to control access to and use of PCI bus 102. Although NIC ASIC 300 is configured as shown in FIG. 4, the present invention is also well suited to various other configurations for NIC ASIC 300. Additionally, in the following description of the present embodiments, NIC 118 generates interrupts for and communicates with host computer 100 of FIGS. 1 and 3, via PCI bus 102. Although the present embodiments specifically recite the use of a PCI bus, the present invention is also well suited to an embodiment employing various other busses. That is, the present invention is well suited to an embodiment in which the bus is, for example, a USB (universal serial bus), an ISA (industry standard architecture) bus, a SCSI (small computer systems interface) bus, an IEEE (Institute of Electronics and Electrical Engineers, Inc.) 1394 serial bus, an EISA (extended industry standard architecture) bus, and the like.

Referring now to steps 402–404 of FIG. 4, although all peripheral component events are coalesced together in this embodiment, the present invention is also well suited to an embodiment in which peripheral component events are grouped and wherein each group is separately coalesced. Thus, instead of generating the first interrupt each time a number of peripheral component events equal to the quantity threshold are received, in one embodiment of the present invention, the first interrupt will only be generated when, for example, the number of peripheral component events coalesced in a designated group is equal to the quantity threshold for that group. In one embodiment, peripheral component events that relate to transmissions from the host computer (hereinafter "transmit peripheral component events") are coalesced separately from peripheral component events that relate to transmissions to the host computer (hereinafter "receive peripheral component events"). In such an embodiment, transmit peripheral component events are separately coalesced and a single interrupt is generated once a number of transmit peripheral component events are obtained equal to a quantity threshold. Similarly, receive peripheral component events are separately coalesced, and a single interrupt is generated once a number of receive peripheral component events are obtained equal to the quantity threshold. In one embodiment, the quantity threshold is eight to sixteen for transmit peripheral component events and is two to four for receive peripheral component events. The quantity threshold for receive peripheral component events is lower than the quantity threshold for transmit peripheral component events because many network protocols are sequential, requiring acknowledgment of receipt before other transmissions will be sent.

In the embodiment where peripheral component events are divided into groups that are separately coalesced, triggering of an interrupt operates to transmit any coalesced events present that have not yet generated an interrupt. That is, the present invention services the event that triggered the initial interrupt and then also services any coalesced events that are present. Alternatively, upon the triggering of an interrupt, only those coalesced events present in the group of coalesced events that triggered the interrupt are transmitted.

Referring now to the embodiment shown in FIGS. 1–3, peripheral component events are serviced by host computer 100. In one embodiment, peripheral component events are stored in the system memory of the host computer such as, for example, RAM 106 upon the generation of an interrupt. The interrupt is transmitted over PCI bus 102 and is processed by host CPU 104. The host CPU 104 can only process a limited number of peripheral component events at any one time. Thus, typically, some of the peripheral component events will be immediately processed or "serviced", leaving peripheral component events that are not serviced. Typically the peripheral components not serviced remain in system memory until serviced by the host CPU 104.

Referring now to step 405 of FIG. 4, servicing of peripheral component events is monitored to determine the number of peripheral component events that are not serviced. In the embodiment shown in FIGS. 2–3, NIC 118 monitors the servicing of peripheral component events, counting the number of peripheral component events not serviced.

As shown in step 406 of FIG. 4, the quantity threshold is varied according to the number of peripheral component events not serviced. In one embodiment, the quantity threshold is increased by the number of peripheral component events not serviced. Alternatively, any of a number of other methods can be used to determine a new quantity threshold that accounts for the number of events not serviced. In one embodiment that incorporates the structure of FIGS. 2–3, an algorithm operating within ASIC 300 adjusts the quantity threshold to reflect the number of events not serviced.

Referring to steps 407 of FIG. 4, in the present embodiment, the number of peripheral component events that are coalesced is compared to the newly adjusted quantity threshold. If the number of coalesced peripheral component events has not reached the quantity threshold, as shown by line 411, the present embodiment returns to step 405 and continues monitoring the servicing of peripheral component events (step 405), varying the quantity threshold (step 406), and determining whether the number of coalesced peripheral component events has reached the quantity threshold (step 407). If, on the other hand, the number of coalesced peripheral component events has reached or exceeded the quantity threshold, the present embodiment proceeds to step 408.

As shown by step 408, a second interrupt is generated when the number of coalesced peripheral component events has reached the quantity threshold. The generation of the second interrupt based on a quantity threshold that varies according to the number of peripheral component events serviced provides a system that optimizes interrupts. That is, interrupts are not generated until an optimum time that reflects the operation of the host CPU.

Referring to steps 402–408, several substantial benefits are associated with the present invention. As mentioned above, considerable CPU overhead is associated with getting into and out of the interrupt service routine. For example, the CPU must cease performing its current selected task; store relevant data, pointers, and the like; service the event; and return to the selected task. This invention, however, reduces the CPU overhead associated with servicing of the interrupts by optimizing the generation of interrupts. Specifically, in the present embodiment, in order service the event that triggered the initial interrupt and the coalesced events, the CPU will cease performing its current selected task; store relevant data, pointers, and the like; service the event which triggered the initial interrupt and service the coalesced events; and return to the selected task on only those occasion required for optimal performance.

Referring to steps 402–408 of FIG. 4, it will be seen that the benefits associated with the present invention are particularly substantial in an instance where numerous events have not been serviced by the host CPU. In such an instance, unnecessary interrupts will not be generated. Rather, interrupt generation will be optimized so as to provide optimal performance.

Figure 5:
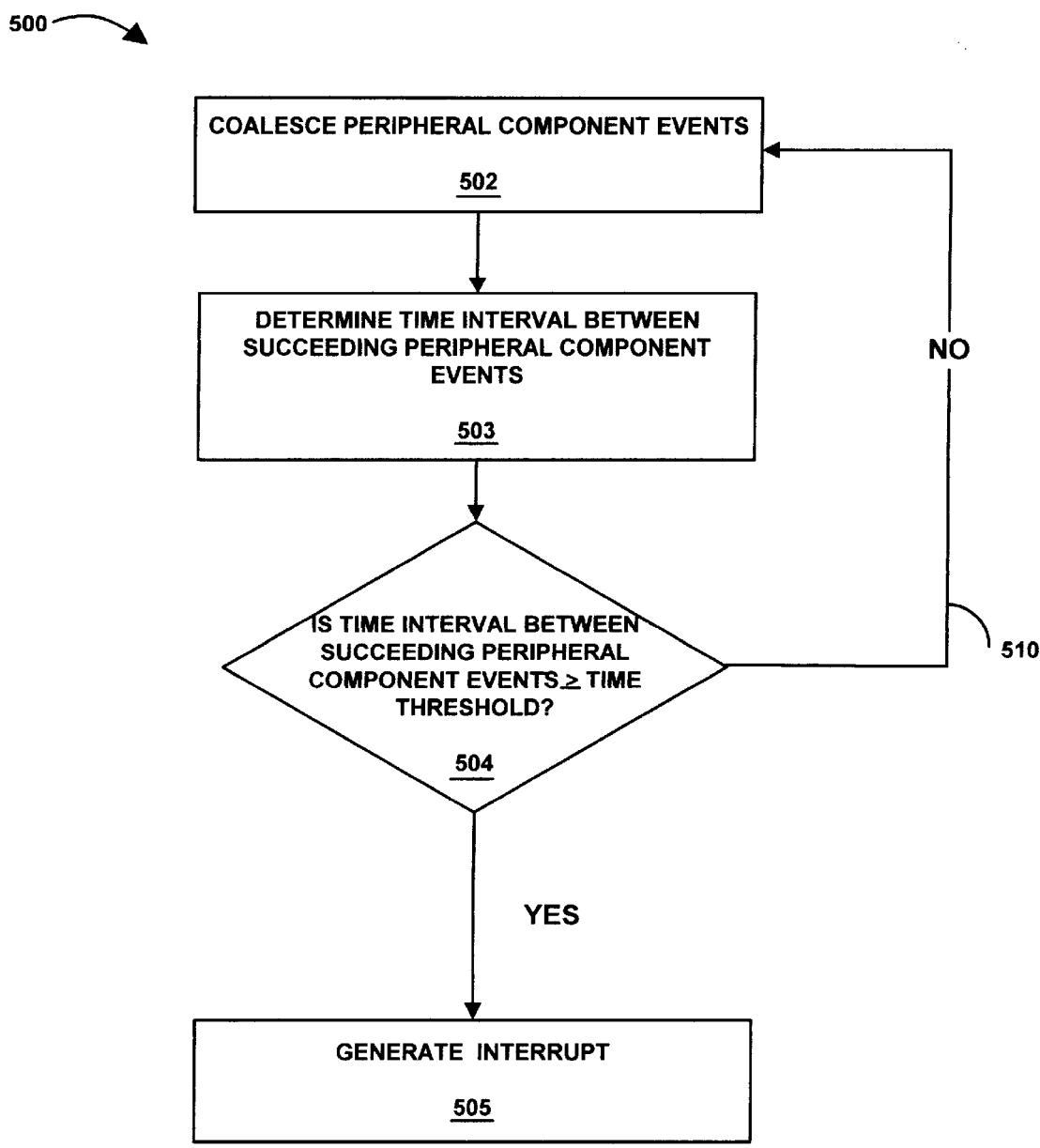
FIG. 5 is a flow chart of steps performed in one implementation of an interrupt optimization method in accordance with one embodiment of the present claimed invention.

FIG. 5 shows an alternate embodiment in which interrupt generation is optimized according to the time interval between succeeding peripheral component events. Referring now to step 502, peripheral component events are coalesced. In the embodiment shown in FIG. 3, peripheral component events are coalesced by storing incoming peripheral component events in memory storage registers of ASIC 300.

Referring to steps 503 of FIG. 5, the time interval between succeeding peripheral component events is determined. In one embodiment, the time interval between succeeding peripheral component events is the time interval between immediately succeeding peripheral component events. In one embodiment, the time interval between immediately succeeding peripheral events is determined by initiating a timer each time that a peripheral component event is received. In the embodiment shown in FIGS. 2–3, the time interval between immediately succeeding peripheral component events is determined by initiating a counter within ASIC 300 each time that a peripheral component event is received. Alternatively, other methods for determining the time interval between succeeding peripheral component events can be used, such as, for example, determining the time interval for receiving two, three or four peripheral component events.

Referring to step 504 of FIG. 5, the time interval between succeeding peripheral component events is compared to a predetermined threshold (hereinafter the "time threshold"). In an embodiment where the time interval between succeeding peripheral component events is determined by starting a timer each time that a peripheral component event is received, unless a succeeding peripheral component event is received before the timer reaches the time threshold, an interrupt is generated. The time threshold is set so as to identify an idle time period. That is, by appropriately setting the time threshold, busy conditions and idle conditions are determined. For example, when numerous peripheral component events are received in rapid succession, NIC 118 of FIG. 3 is experiencing a "busy" condition. However, when NIC 118 of FIG. 3 has not received a peripheral component event in a given time interval, an "idle" condition exists.

Referring still to FIG. 5, if the time interval between succeeding peripheral components is not greater than or equal to a predetermined threshold, as shown by line 510, the present embodiment returns to step 502 and continues coalescing peripheral component events (502), determining the time interval between succeeding peripheral component events (503), and comparing the time interval between succeeding peripheral component events to the time threshold (504). If, on the other hand, the time interval between succeeding peripheral component events is greater than or equal to the time threshold, the present embodiment proceeds to step 505.

Referring now to step 505 of FIG. 5, an interrupt is generated. In one embodiment, the triggering of an interrupt operates to transmit all coalesced events. That is, the present invention services the event that triggered the initial interrupt and then also services any coalesced events that are present. In the embodiment shown in FIGS. 1–3, the interrupt is generated by NIC 118 via PCI (peripheral component interconnect) bus control logic 302.

Referring now to steps 502–505 of FIG. 5, although all peripheral component events are coalesced together in this embodiment, the present invention is also well suited to an embodiment in which peripheral component events are grouped and wherein each group is separately coalesced. In one embodiment, transmit peripheral component events are coalesced separately from receive peripheral component events. In such an embodiment, transmit peripheral component events are separately coalesced and a single interrupt is generated once the time interval between succeeding peripheral component events is greater than or equal to the time threshold. Similarly, receive peripheral component events are separately coalesced, and a single interrupt is generated once the time interval between succeeding peripheral component events is greater than or equal to the time threshold.

Continuing with steps 502–505 of FIG. 5, determining the time interval between succeeding peripheral component events and determining whether the time interval between succeeding peripheral component events meets or exceeds a predetermined time threshold operates to determine when an idle condition is present. This allows for the transmission of an interrupt only when the peripheral component is not busy. This optimizes the operations of the peripheral component and eliminates the generation of unnecessary interrupts. More particularly, when numerous peripheral component events are received in rapid succession (busy condition), the peripheral component events are coalesced until an idle time is detected (step 504). Because interrupt signals are not generated during busy conditions, peripheral component events received during busy conditions are accumulated. The interrupt is then generated during the idle time, limiting the total number of interrupts generated and thereby conserving host computer resources.

Figure 6:
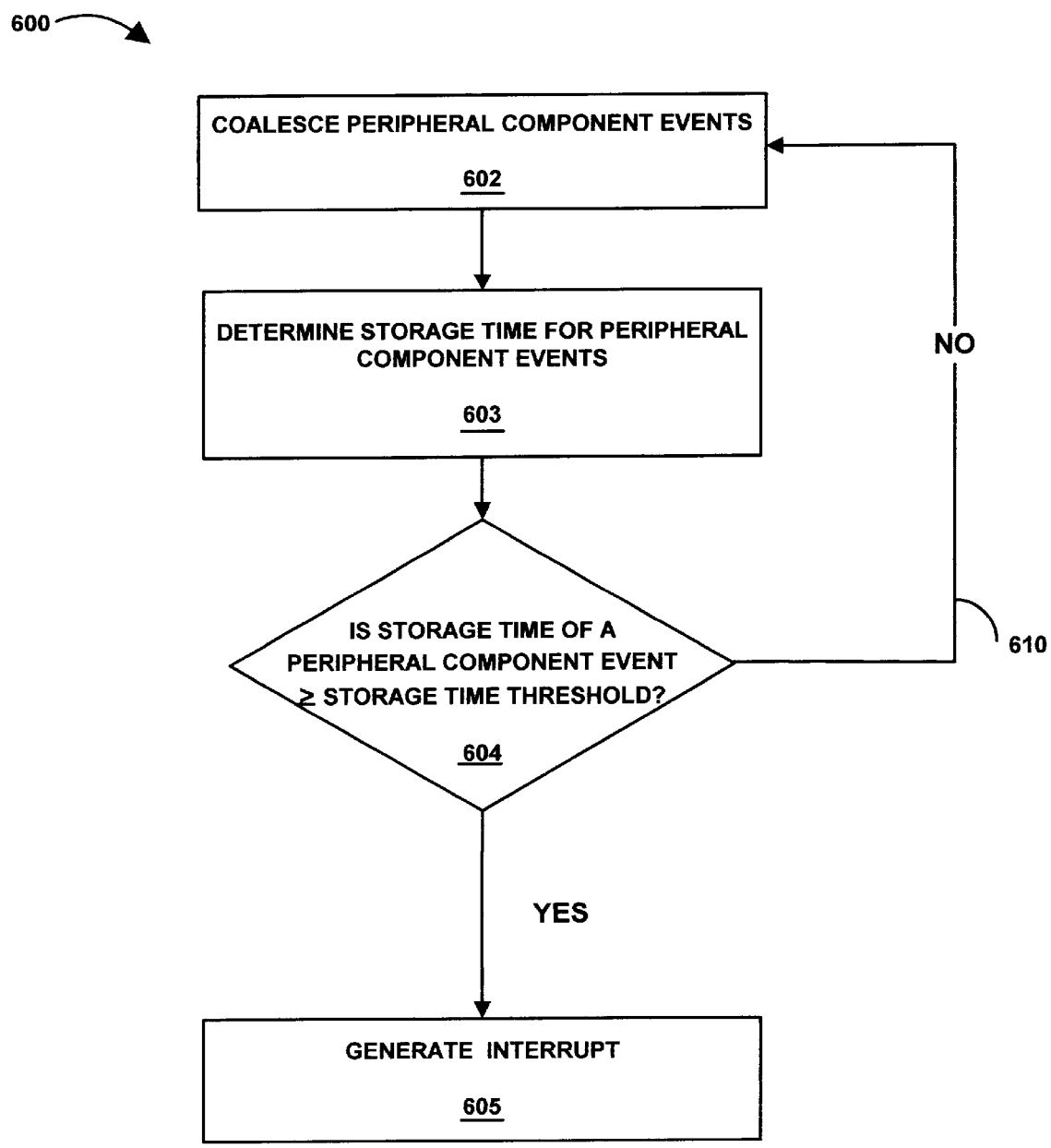
FIG. 6 is a flow chart of steps performed in one implementation of an interrupt optimization method in accordance with one embodiment of the present claimed invention.

FIG. 6 shows an alternate embodiment in which interrupt generation is optimized according to the storage time of coalesced peripheral component events. Referring now to step 602, peripheral component events are coalesced. In the embodiment shown in FIG. 2, peripheral component events are coalesced by storing incoming peripheral component events in memory storage registers of ASIC 300.

Referring to steps 603 of FIG. 6, the time that a peripheral component event has been stored or "coalesced" (the "storage time") is determined. In one embodiment, the storage time is determined by initiating a timer each time that a peripheral component event is received. In the embodiment shown in FIGS. 2–3, the storage time is determined by initiating a counter within ASIC 300 each time that a peripheral component event is received.

Referring to step 604 of FIG. 6, the storage time for a peripheral component event is compared to a predetermined threshold (hereinafter the "storage time threshold"). In the embodiment shown in FIGS. 2–3, ASIC 300 compares the storage time of coalesced peripheral component events to a storage time threshold that is stored in a designated memory register. The storage time threshold is set so as to identify peripheral component events that have remained in storage too long. That is, by properly setting the storage time threshold, coalescing of peripheral component events is optimized such that peripheral component events are not stored so long that they become "stale" or old. This assures that all received peripheral component events are serviced in a timely manner.

Referring still to FIG. 6, if the storage time for a peripheral component event is not greater than or equal to a predetermined threshold, as shown by line 610, the present embodiment returns to step 602 and continues coalescing peripheral component events (602), determining the storage time for peripheral component events (603), and comparing the storage time of coalesced peripheral component events to the storage time threshold (604). If, on the other hand, the storage time for a peripheral component event is greater than or equal to the storage time threshold, the present embodiment proceeds to step 605.

Referring now to step 605 of FIG. 6, an interrupt is generated. In the embodiment shown in FIGS. 1–3, the interrupt is generated by NIC 118. For example, once NIC 118 has coalesced a number of events such as, for example, transmit complete events, and once one of the coalesced peripheral component events has been stored for a storage time greater than or equal to the storage time threshold, NIC 118 generates an interrupt via PCI (peripheral component interconnect) bus control logic 302. In one embodiment, the triggering of an interrupt operates to transmit all coalesced events. That is, the present invention services the event that triggered the initial interrupt and then also services any coalesced events that are present. Alternatively, only the peripheral component event that triggers the generation of an interrupt is serviced.

Referring now to steps 602–605 of FIG. 6, although all peripheral component events are coalesced together in this embodiment, the present invention is also well suited to an embodiment in which peripheral component events are grouped and wherein each group is separately coalesced. In one embodiment, transmit peripheral component events are coalesced separately from receive peripheral component events. In an embodiment where peripheral component events are divided into groups that are separately coalesced, triggering of an interrupt operates to transmit any coalesced events present that have not yet generated an interrupt. That is, the present invention services the event that triggered the initial interrupt and then also services any coalesced events that are present. Alternatively, upon the triggering of an interrupt, only those coalesced events present in the group of coalesced events that triggered the interrupt are transmitted.

The embodiments of the present invention shown in FIGS. 4–6 are well adapted to be used in combination with each other. For example, in an alternate embodiment, the method for optimizing interrupt events of FIG. 4 is combined with the method for optimizing interrupt events of FIG. 5 such that interrupts are generated based on the number of peripheral component events coalesced and based on the time interval between succeeding peripheral component events. In another embodiment, the method for optimizing interrupt events of FIG. 4 is combined with the method for optimizing interrupt events of FIG. 6 such that interrupts are generated based on the number of peripheral component events coalesced and based on the storage time of coalesced peripheral component events. In another embodiment, the method for optimizing interrupt events of FIG. 5 is combined with the method for optimzing interrupt events of FIG. 6 such that interrupts are generated based on the time interval between succeeding peripheral component events and based on the storage time of coalesced peripheral component events. In yet another embodiment, the method for optimizing interrupt events of FIGS. 4–6 are combined such that interrupts are generated based on the number of peripheral component events coalesced, based on the time interval between succeeding peripheral component events and based on the storage time of coalesced peripheral component events.

Therefore, it will be seen that the method for optimizing interrupt events of the present invention optimizes the frequency with which interrupts are generated, and minimizes the CPU overhead associated with the servicing of interrupts. This minimizes CPU utilization and overhead due to interrupt generation, maximizes bandwidth and throughput, and makes efficient use of the PCI bus.

Figure 7:
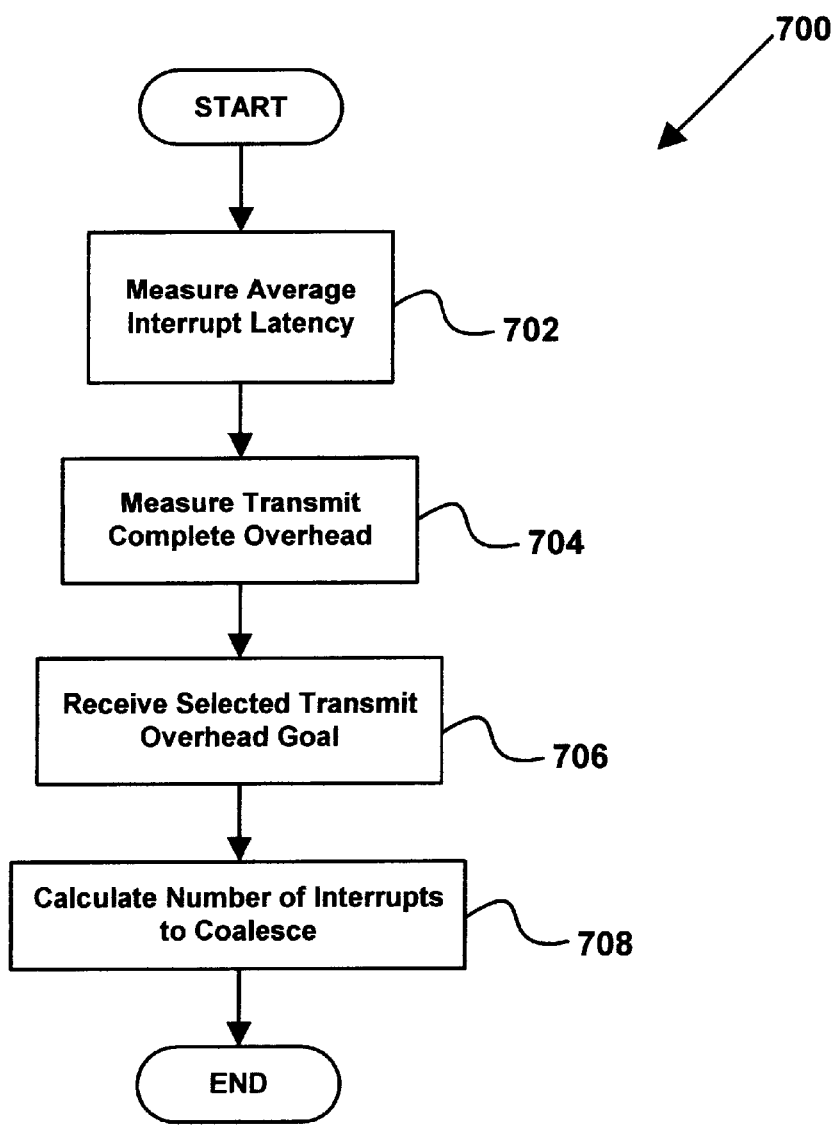
FIG. 7 is a flow chart of steps performed in one implementation of an event coalescing quantity calculation method in accordance with one embodiment of the present claimed invention.
Figure 8:
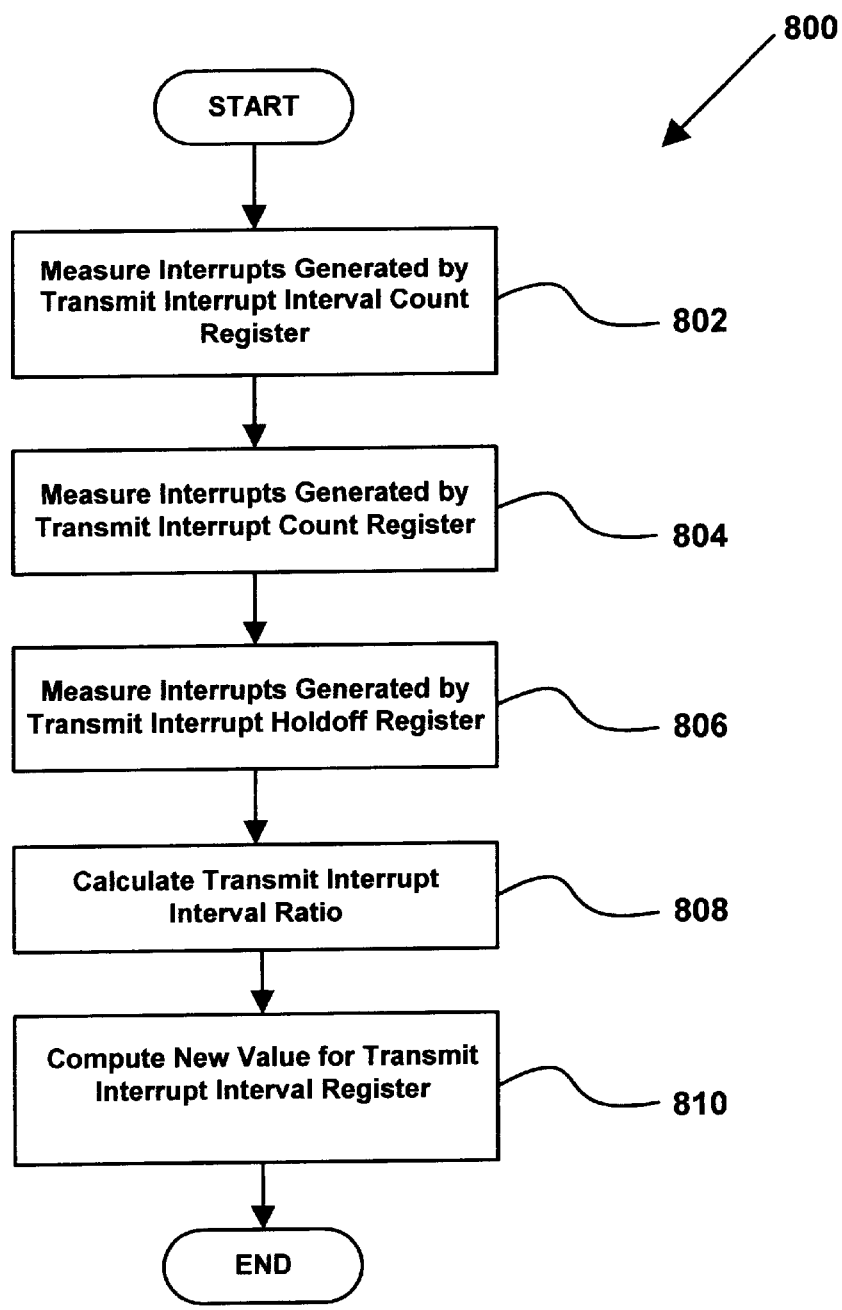
FIG. 8 is a flow chart of steps performed in one implementation of an interrupt interval calculation method in accordance with one embodiment of the present claimed invention.
Figure 9:
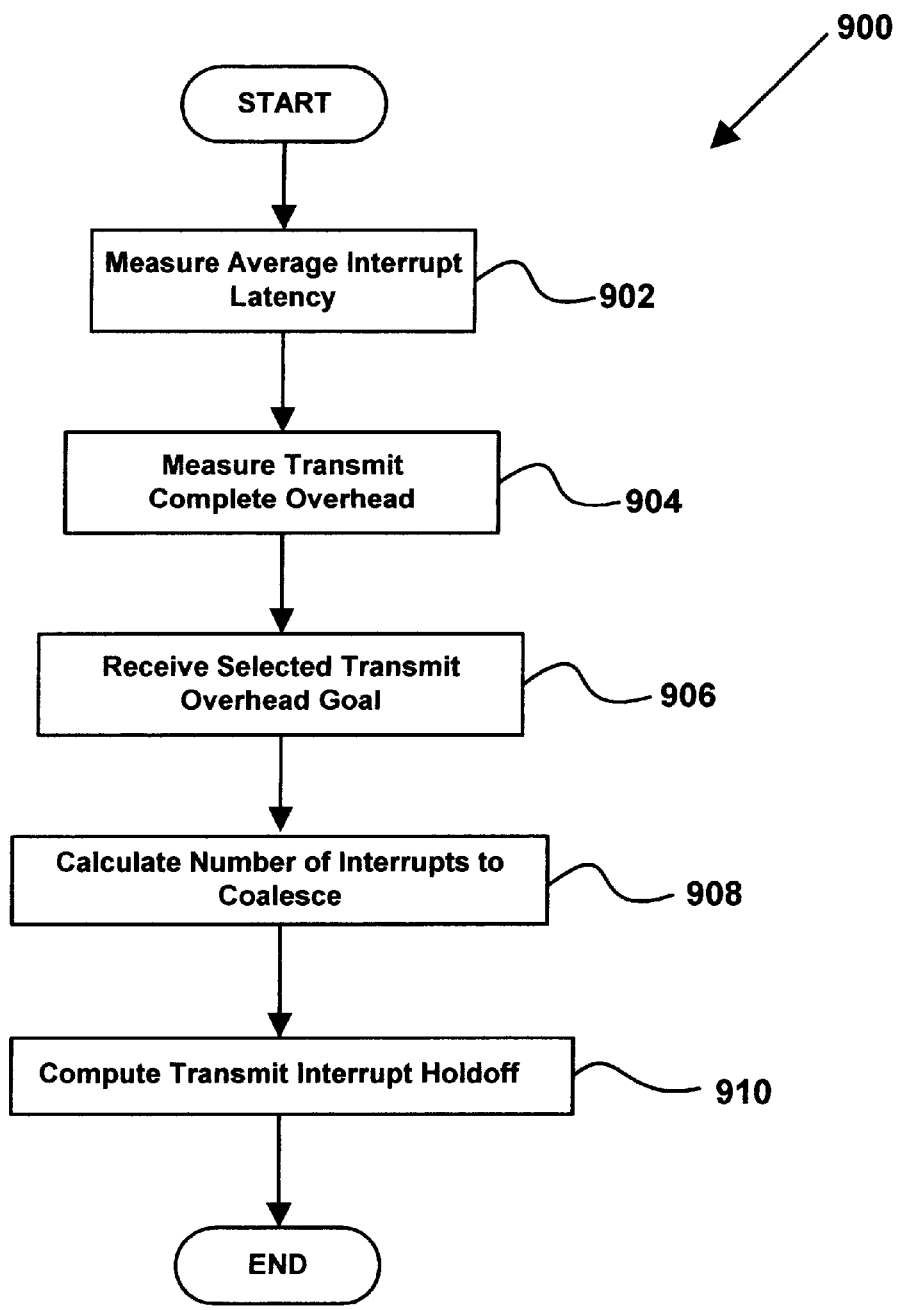
FIG. 9 is a flow chart of steps performed in one implementation of an interrupt holdoff calculation method in accordance with one embodiment of the present claimed invention.

With reference now to FIGS. 7–9, flow charts 700, 800, and 900, respectively, of steps performed by various embodiments of the present invention are shown. As an overview, FIG. 7 is a flow chart 700 of steps used to dynamically determine the most efficient quantity of peripheral component events to coalesce (i.e. the quantity threshold). FIG. 8 is a flow chart 800 of steps used to dynamically determine the maximum amount of time which can lapse between successive peripheral component events before generating a corresponding interrupt (i.e. the time threshold). Finally, FIG. 9 is a flow chart 900 of steps used to dynamically determine the maximum amount of time a peripheral component event can be stored before generating a corresponding interrupt (i.e. the storage time threshold).

With reference now to FIG. 7, flow chart 700 begins with step 702. For purposes of clarity, the following embodiments of the present invention specifically refer to interrupts corresponding to transmit-related peripheral component events. The present invention is, however well suited to various other embodiments where, for example, interrupts are generated and correspond to, for example, receive events. At step 702 the present embodiment measures the average interrupt latency. The interrupt latency is the amount of time from when an interrupt is asserted to the host until device driver is given control. In the present embodiment, the interrupt latency is measured for every interrupt and the measured times are then summed and divided by the number of times summed to compute the average interrupt latency. As stated above, in the following description of embodiments of the present invention, the peripheral component driver is a network interface card driver. Additionally, in the following description of embodiments of the present invention, the peripheral component is a network interface card. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver. Additionally, the present invention is well suited to use in an embodiment in which the peripheral component is, for example, a rate controller, a small computer system interface (SCSI) controller, a graphics card, and the like.

At step 704, the present embodiment measures the transmit complete overhead. The transmit complete overhead refers to the amount of time the host operating system requires, for example, to recognize an indication from the device driver that a particular event has occurred. More particularly, in one embodiment, the transmit complete overhead refers to the amount of time it takes for the peripheral component (e.g. a network interface card) to receive a call return from the host operating system after the peripheral component has sent a transmit complete message to the host operating system.

At step 706, the present embodiment receives a selected transmit overhead goal. In one embodiment, the selected transmit overhead goal is entered, for example, by a user via alpha-numeric input 112 of FIG. 1. In the present embodiment, the selected transmit overhead goal is set at less than or equal to approximately 25 percent. That is, the percentage of the complete overhead which is attributable to the host computer is desired to be less than or equal to 25 percent of the total overhead associated with servicing an interrupt. Although such a value is recited in the present embodiment, it will be understood that the present invention is well suited to receiving any of various other values for the selected transmit overhead goal. The present invention is also well suited to an embodiment in which the selected transmit overhead goal is defined within the peripheral component driver and is not received from a user.

At step 708, the present embodiment calculates the number of interrupts to coalesce. In the present embodiment, the number or quantity of peripheral component events to coalesce (i.e. the quantity threshold) is referred to as the packet goal. Again, for purposes of clarity, the following embodiments of the present invention specifically refer to interrupts corresponding to transmit-related peripheral component events, hence the term packet goal. However, "packet goal" more generally describes the number of interrupts to coalesce. In the present embodiment, the packet goal is computed as follows:

Packet Goal=[Average Interrupt Latency * (100−Transmit Overhead Goal)] divided by [(Transmit Complete Overhead) * (Transmit Overhead Goal)]

Referring still to step 708, the present embodiment periodically repeats steps 702–708 such that the quantity of peripheral component events to coalesce is periodically refreshed. In so doing, the present invention dynamically assesses the most efficient number of peripheral component events which are to be coalesced and alters that number when necessary to improve operation of the system. Thus, unlike prior art systems, the present embodiment is not limited to a set "watermark" or quantity threshold. Instead, the present embodiment is able to dynamically adjust the quantity threshold to the most appropriate level.

Referring now to FIG. 8, as mentioned above, a flow chart 800 of steps used to dynamically determine the maximum amount of time which can lapse between successive peripheral component events before generating a corresponding interrupt (i.e. the time threshold) is shown. At step 802, the present embodiment measures interrupts generated by a transmit interrupt interval count register (Transmit Interrupt Interval Count). That is, the present embodiment determines how many interrupts were generated by reaching the time threshold. As in the embodiment of FIG. 7, for purposes of clarity, the following embodiments of the present invention specifically refer to interrupts corresponding to transmit-related peripheral component events. The present invention is, however well suited to various other embodiments where, for example, interrupts are generated and correspond to, for example, receive events.

At step 804, the present embodiment measures the interrupts generated by a transmit interrupt count register (Transmit Interrupt Count). That is, the present embodiment determines how many interrupts were generated by reaching the quantity threshold.

At step 806, the present embodiment measures the interrupts generated by a transmit interrupt holdoff register (Transmit Interrupt Holdoff Count). That is, the present embodiment determines how many interrupts were generated by reaching the storage time threshold.

At step 808, the present embodiment calculates the Transmit Interrupt Interval Ratio. That is, the present embodiment determines the ratio of number of interrupts which were generated by reaching the time threshold vs. the number of interrupts which were generated by reaching the quantity threshold and by reaching the storage time threshold. In the present embodiment, the transmit interrupt interval ratio is computed as follows:

Transmit Interrupt Interval Ratio=[(Transmit Interrupt Interval Count) * 100] divided by [(Transmit Interrupt Count Count)+(Transmit Interrupt Holdoff Count)+(Transmit Interrupt Interval Count)]

At step 810, the present embodiment compares the Transmit Interrupt Interval Ratio to a selected transmit interrupt interval goal. The selected transmit interrupt interval goal is entered, for example, by a user via alpha-numeric input 112 of FIG. 1. The selected transmit interrupt interval goal represents the desired ratio of the number of interrupts which were generated by reaching the time threshold vs. the number of interrupts which were generated by reaching the quantity threshold and by reaching the storage time threshold. The present embodiment, it will be understood that the present invention is well suited to receiving any of various values for the selected transmit interrupt interval goal. The present invention is also well suited to an embodiment in which the selected transmit interrupt interval goal is defined within the peripheral component driver and is not received from a user.

Referring still to step 810, if the transmit interrupt interval ratio minus a buffer margin is compared to the transmit interrupt interval goal. In the present embodiment, the buffer margin is approximately plus or minus 10 percent to provide flexibility in the following calculations. In step 810, if the transmit interrupt interval ratio minus a buffer margin is greater than the transmit interrupt interval goal, the transmit interrupt interval is set at:

[2 * (Maximum Packet Size) * 8] divided by 16

In the equation above, maximum packet size refers to the size of the largest packet being transmitted. Once again, for purposes of clarity, these embodiments of the present invention specifically refer to interrupts corresponding to transmit-related peripheral component events. The present invention is, however well suited to various other embodiments where, for example, interrupts are generated and correspond to, for example, receive events. Additionally, the resultant answer to the above equation will be in nanoseconds. Thus, the present embodiment calculates the maximum allowable time interval which can lapse between successive peripheral component events before an interrupt is generated.

Still referring to step 810, if the transmit interrupt interval ratio plus the buffer margin is less than the transmit interrupt interval goal, the transmit interrupt interval is set at:

[8 * (Maximum Packet Size) * 8] divided by 16

Again, the resultant answer to the above equation will be in nanoseconds.

Still referring to step 810, if the transmit interrupt interval ratio is equal to the transmit interrupt interval goal, the transmit interrupt interval is set at:

[4 * (Maximum Packet Size) * 8] divided by 16

Again, the resultant answer to the above equation will be in nanoseconds. The present embodiment periodically repeats steps 802–810 such that the maximum allowable time interval which can lapse between successive peripheral component events before an interrupt is generated is periodically refreshed. In so doing, the present invention dynamically assesses the most efficient maximum allowable time interval which can lapse between successive peripheral component events before an interrupt is generated and alters that interval when necessary to improve operation of the system. Thus, unlike prior art systems, the present embodiment is not limited to a set "watermark" or time threshold. Instead, the present embodiment is able to dynamically adjust the time threshold to the most appropriate level.

With reference now to FIG. 9, flow chart 900 begins with step 902. At step 902 the present embodiment measures the average interrupt latency. The interrupt latency is the amount of time from when an interrupt is asserted to the host until device driver is given control. In the present embodiment, the interrupt latency is measured for every interrupt and the measured times are then summed and divided by the number of times summed to compute the average interrupt latency. As stated above, in the following description of embodiments of the present invention, the peripheral component driver is a network interface card driver. Additionally, in the following description of embodiments of the present invention, the peripheral component is a network interface card. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver. Additionally, the present invention is well suited to use in an embodiment in which the peripheral component is, for example, a rate controller, a small computer system interface (SCSI) controller, a graphics card, and the like.

At step 904, the present embodiment measures the transmit complete overhead. The transmit complete overhead refers to the amount of time the host operating system requires, for example, to recognize an indication from the device driver that a particular event has occurred. More particularly, in one embodiment, the transmit complete overhead refers to the amount of time it takes for the peripheral component (e.g. a network interface card) to receive a call return from the host operating system after the peripheral component has sent a transmit complete message to the host operating system.

At step 906, the present embodiment receives a selected transmit overhead goal. In one embodiment, the selected transmit overhead goal is entered, for example, by a user via alpha-numeric input 112 of FIG. 1. In the present embodiment, the selected transmit overhead goal is set at less than or equal to approximately 25 percent. That is, the percentage of the complete overhead which is attributable to the host computer is desired to be less than or equal to 25 percent of the total overhead associated with servicing an interrupt. Although such a value is recited in the present embodiment, it will be understood that the present invention is well suited to receiving any of various other values for the selected transmit overhead goal. The present invention is also well suited to an embodiment in which the selected transmit overhead goal is defined within the peripheral component driver and is not received from a user.

At step 908, the present embodiment calculates the number of interrupts to coalesce. In the present embodiment, the number or quantity of peripheral component events to coalesce (i.e. the quantity threshold) is referred to as the packet goal. Again, for purposes of clarity, the following embodiments of the present invention specifically refer to interrupts corresponding to transmit-related peripheral component events, hence the term packet goal. However, "packet goal" more generally describes the number of interrupts to coalesce. In the present embodiment, the packet goal is computed as follows:

Packet Goal=[Average Interrupt Latency * (100−Transmit Overhead Goal)] divided by [(Transmit Complete Overhead) * (Transmit Overhead Goal)]

At step 910, the present embodiment uses the packet goal quantity to compute the maximum amount of time said peripheral component event can be stored before generating a corresponding interrupt. More specifically, in step 910, the transmit interrupt holdoff time is set at:

[(Packet Goal) * (Maximum Packet Size) * 8] divided by 16

In the equation above, maximum packet size refers to the size of the largest packet being transmitted. Once again, for purposes of clarity, these embodiments of the present invention specifically refer to interrupts corresponding to transmit-related peripheral component events. The present invention is, however well suited to various other embodiments where, for example, interrupts are generated and correspond to, for example, receive events. Additionally, the resultant answer to the above equation will be in nanoseconds. Thus, the present embodiment calculates the maximum amount of time a peripheral component event can be stored before generating a corresponding interrupt.

Referring still to step 910, the present embodiment periodically repeats steps 902–910 such that the maximum amount of time a peripheral component event can be stored before generating a corresponding interrupt is periodically refreshed. In so doing, the present invention dynamically assesses the most efficient maximum amount of time a peripheral component event can be stored before generating a corresponding interrupt and alters that storage time when necessary to improve operation of the system. Thus, unlike prior art systems, the present embodiment is not limited to a set "watermark" or storage time threshold. Instead, the present embodiment is able to dynamically adjust the storage time threshold to the most appropriate level.

Thus, the present invention provides an interrupt event optimization system that reduces the frequency with which interrupts are generated. The present invention also provides a interrupt event optimization system that minimizes the CPU overhead associated with the servicing of interrupts. The present invention further provides a interrupt event optimization system that meets the above-listed needs and that operates effectively in a coalesced interrupt environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A method for dynamically calculating the quantity of peripheral component events to coalesce, said method comprising the steps of:

a) measuring the average latency associated with an interrupt generated corresponding to a peripheral component event;

b) measuring a total overhead associated with recognizing said interrupt;

c) receiving a selected goal value for a percentage of said total overhead caused by a host computer; and d) calculating the quantity of said peripheral component events to coalesce such that said percentage of said total overhead caused by said host computer is approximately equal to said selected goal value.

2. The method for dynamically calculating the quantity of peripheral component events to coalesce as recited in claim 1 wherein steps a–d) are performed by a peripheral component driver operating at least partially on said host computer.

3. The method for dynamically calculating the quantity of peripheral component events to coalesce as recited in claim 1 wherein steps a–d) are performed by a network interface card driver operating at least partially on said host computer.

4. The method for dynamically calculating the quantity of peripheral component events to coalesce as recited in claim 1 herein steps a–d) are periodically repeated such that said quantity of said peripheral component events to coalesce is periodically refreshed.

5. In a computer system having a processor coupled to a bus, a computer readable medium coupled to said bus and having stored therein a computer program that when executed by said processor causes said computer system to implement a method for efficiently servicing peripheral component events, said method comprising the steps of:

a) measuring the average latency associated with an interrupt generated corresponding to a peripheral component event;

b) measuring a total overhead associated with recognizing said interrupt;

c) receiving a selected goal value for a percentage of said total overhead caused by a host computer; and d) calculating the quantity of said peripheral component events to coalesce such that said percentage of said total overhead caused by said host computer is approximately equal to said selected goal value.

6. The computer readable medium as described in claim 5 wherein steps a–d) of said computer implemented method stored on said computer readable medium are performed by a peripheral component driver operating at least partially on said host computer.

7. The computer readable medium as described in claim 5 wherein steps a–d) of said computer implemented method stored on said computer readable medium are performed by a network interface card driver operating at least partially on said host computer.

8. The computer readable medium as described in claim 5 wherein steps a–d) of said computer implemented method stored on said computer readable medium are periodically repeated such that said quantity of said peripheral component events to coalesce is periodically refreshed.

* * * * *